US009913091B2

(12) United States Patent
Weksler et al.

(10) Patent No.: US 9,913,091 B2
(45) Date of Patent: Mar. 6, 2018

(54) PROVIDING CONTACT DATA OF SECOND MOBILE DEVICES PROXIMATE TO A TARGET PERSON OF A FIRST MOBILE DEVICE

(71) Applicant: Lenovo (Singapore) Pte. Ltd., Singapore (SG)

(72) Inventors: Arnold S. Weksler, Raleigh, NC (US); Neal R. Caliendo, Jr., Raleigh, NC (US); Justin T. Dubs, Raleigh, NC (US); Antonio Bumarch, III, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/078,401

(22) Filed: Mar. 23, 2016

(65) Prior Publication Data

US 2017/0280287 A1  Sep. 28, 2017

(51) Int. Cl.
*H04W 4/02* (2009.01)
*H04W 8/16* (2009.01)

(52) U.S. Cl.
CPC ........... *H04W 4/023* (2013.01); *H04W 4/021* (2013.01); *H04W 8/16* (2013.01)

(58) Field of Classification Search
CPC ........ H04W 4/023; H04W 8/16; H04W 4/021
USPC .... 455/404.2, 412.1–414.2, 418–422.1, 436, 455/444, 41.1–41.2, 456.1, 456.2, 457, 455/552.1; 370/328–331, 310.2, 370/341–343, 345
See application file for complete search history.

(56) References Cited

U.S. PATENT DOCUMENTS

| 7,545,784 | B2* | 6/2009 | Mgrdechian | ....... | G06Q 30/0207 370/338 |
| 7,627,311 | B2* | 12/2009 | Oijer | ....... | H04L 51/38 348/14.01 |
| 7,869,792 | B1* | 1/2011 | Zhou | ....... | H04M 1/67 455/411 |
| 8,363,086 | B1* | 1/2013 | Shah | ....... | H04W 4/008 348/14.02 |
| 2005/0096009 | A1* | 5/2005 | Ackley | ....... | H04M 1/663 455/405 |
| 2007/0178915 | A1* | 8/2007 | Khan | ....... | H04W 8/14 455/457 |
| 2010/0015976 | A1* | 1/2010 | Issa | ....... | G06F 17/30699 455/435.1 |
| 2011/0111726 | A1* | 5/2011 | Kholaif | ....... | G01S 1/68 455/404.2 |
| 2016/0113049 | A1* | 4/2016 | Kim | ....... | H04W 4/02 455/41.2 |

OTHER PUBLICATIONS

Gruman, "What you need to know about using Bluetooth beacons," InfoWorld, Inc., Jul. 2014, 3 pages.

* cited by examiner

*Primary Examiner* — Babar Sarwar
(74) *Attorney, Agent, or Firm* — VanLeeuwen & VanLeeuwen; Carlos Munoz-Bustamanta (57) ABSTRACT

An approach is disclosed that identifies a location of mobile device associated with a target person, such as a spouse, child, or employee. The approach then identifies other mobile devices that have current locations that are near, or proximate to, the identified location. The requestor is then provided with contact data corresponding to one or more users of the other mobile devices.

20 Claims, 8 Drawing Sheets

PROVIDING CONTACT DATA OF SECOND MOBILE DEVICES PROXIMATE TO A TARGET PERSON OF A FIRST MOBILE DEVICE

BACKGROUND

Mobile technology, such as that found in many smart phones, uses Global Positioning System (GPS) technology, or equivalent, to track the mobile device and identify the geographical location of such mobile devices with accuracy. Such tracking technology is often used to identify the whereabouts of a child or spouse that is the user of the mobile device. However, oftentimes contacting the user of the mobile device is difficult. For example, the audible ringer on the mobile device might be turned off or the user cannot hear the audible ringer due to loud background noise, such as at a party. While other people near the user might be of assistance, the caller is often unaware of which people are proximate to the user and is therefore unable to contact such other individuals.

SUMMARY

An approach is disclosed that identifies a location of mobile device associated with a target person, such as a spouse, child, or employee. The approach then identifies other mobile devices that have current locations that are near, or proximate to, the identified location. The requestor is then provided with contact data corresponding to one or more users of the other mobile devices.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

FIGS. 1-8 show an approach that provides a way to reach a target person, such as a spouse, child, employee, etc., based on the target person's proximity to other contacts. The approach identifies a location of the target person based on a geographical location of a device, such as a smart phone, associated with the target person. In one embodiment, the geographical location is provided based upon Geographic Positioning System (GPS) technology included in the device that is associated with the target person. Other contacts are then identified based upon the target location. In one embodiment, the other contacts are associated with other mobile devices, such as smart phones, that routinely update the other contacts' current location at a service provider, such as a social media site, etc. In a further embodiment, the contacts are able to configure preferences that determine which people are provided access to the contacts' current location information. When a contact is identified that is proximate to the target person, that contact's information is provided to the requestor. The requestor can then contact such contact (e.g., via text message, phone call, etc.) to let the contact know that the requestor is attempting to reach the target person.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
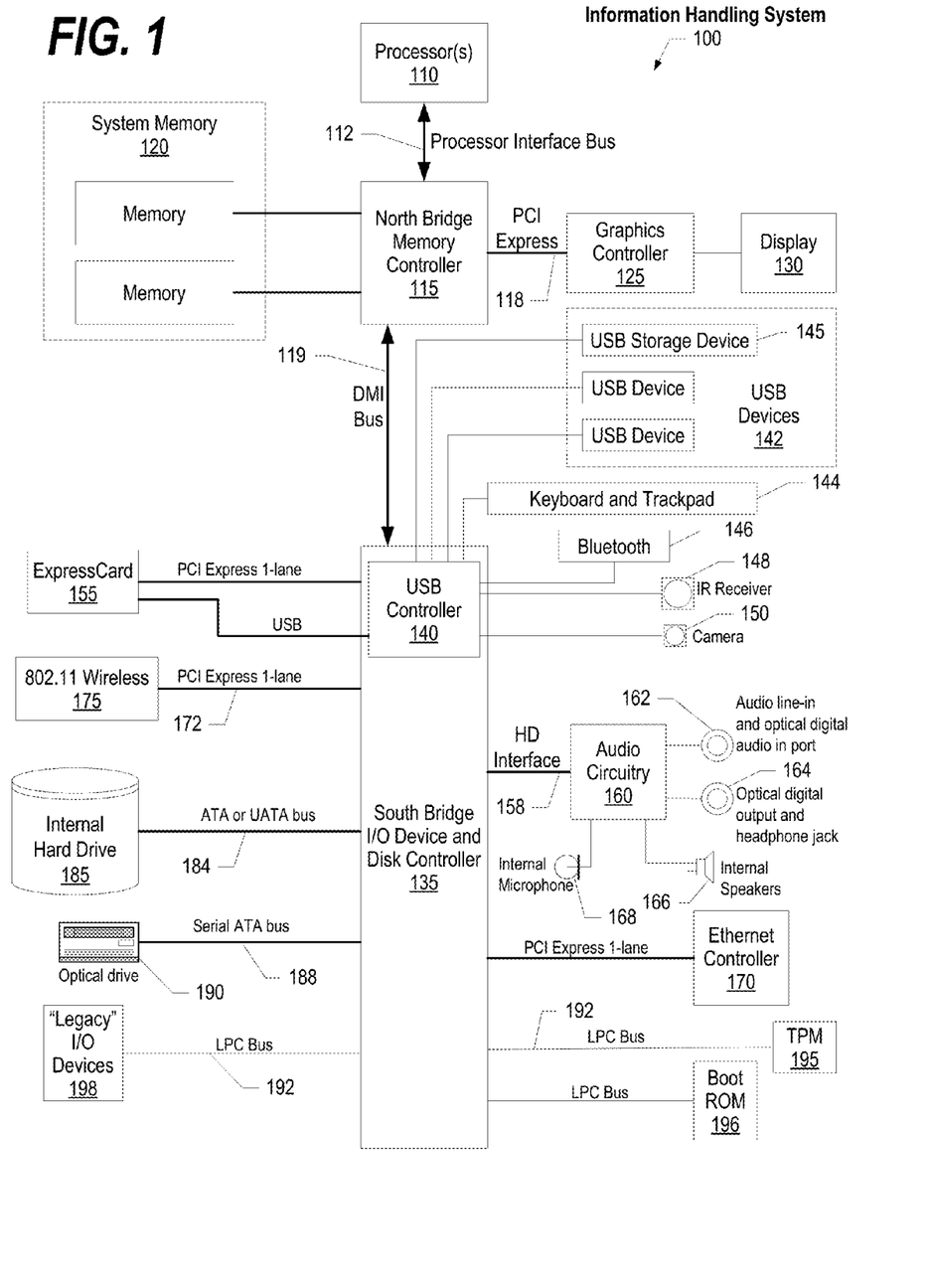
FIG. 1 is a block diagram of a data processing system in which the methods described herein can be implemented.
Figure 2:
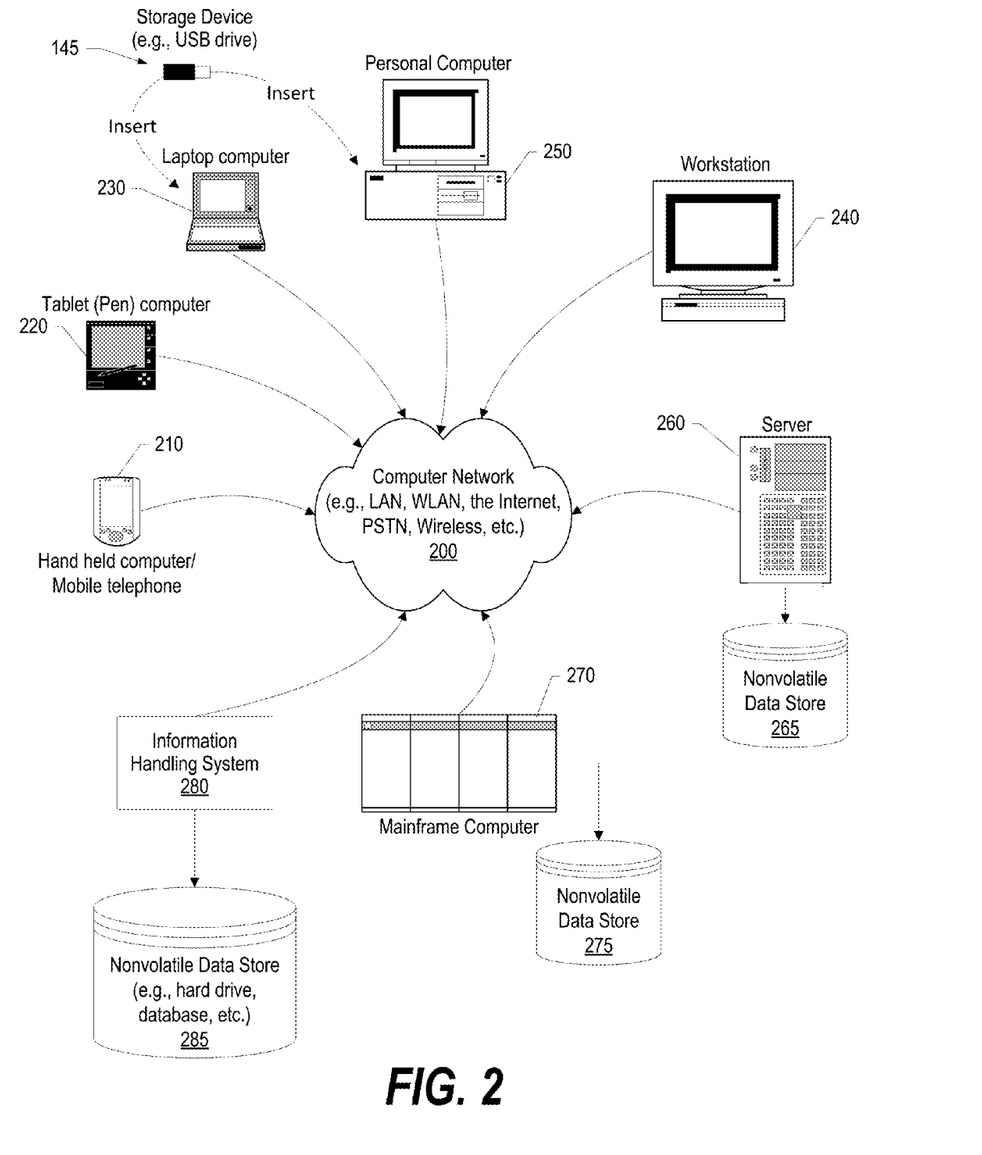
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
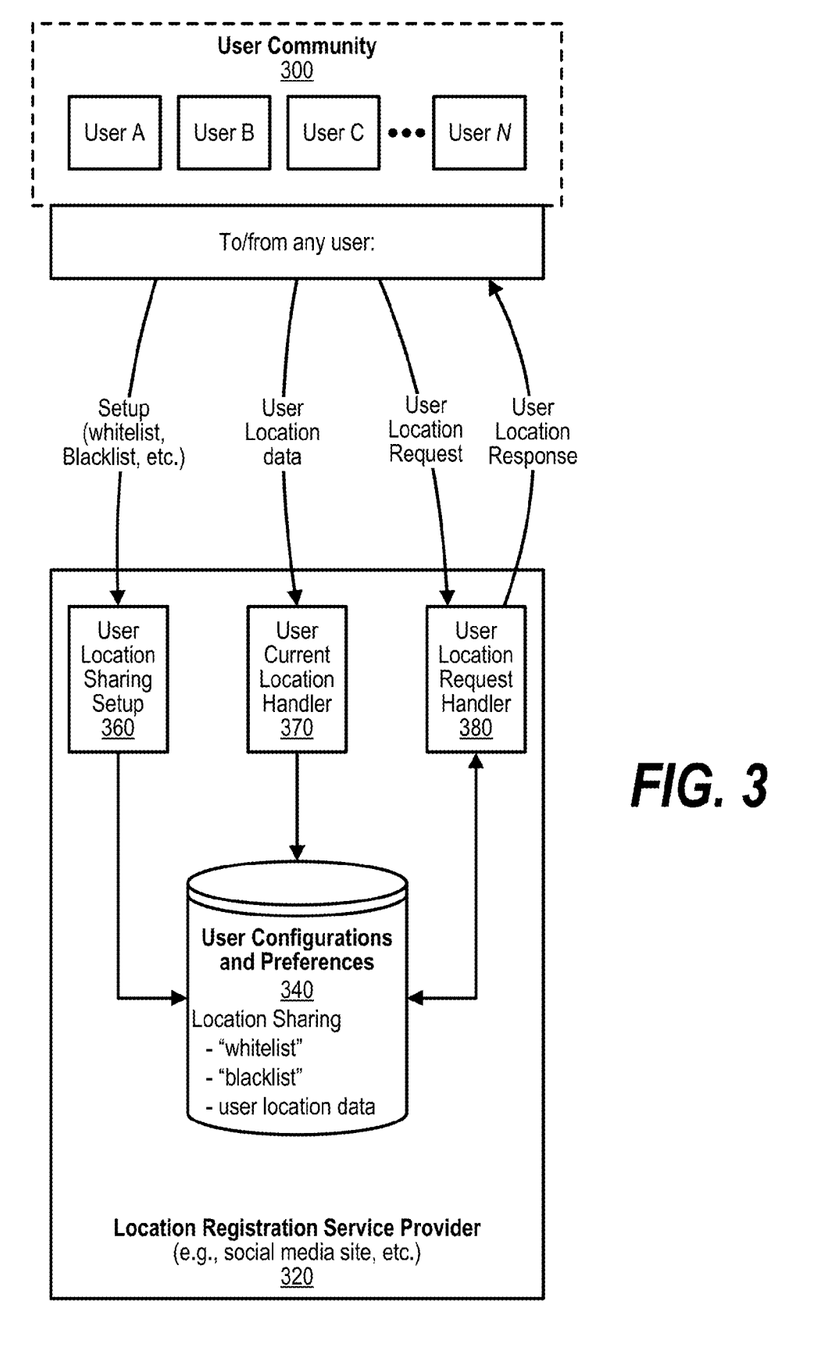
FIG. 3 is a component diagram depicting the identification of objects and people in proximity to a located object or person.

FIG. 3 is a component diagram depicting the identification of objects and people in proximity to a located object or person. User community 300 is a group of users, such as a set of social media users, employees of an organization, etc. Service provider 320 provides services to the user community, such as social media services in the case of a social media community, organizational services in the case of a business or other type of organization, and the like. One of the services that service provider 320 provides is location services so that users of the user community can geographically locate one another. Data store 340 is used to maintain user configurations, preferences, and current geographic locations of users served by service provider 320. Location sharing data includes access data such as "whitelists" that identify users from the user community that are allowed to retrieve a particular user's current geographic location, "blacklists" that identify users from the user community that are denied access to a particular user's current geographic location, and current user location data that is periodically updated as the user moves about. The users' current geographic locations are received from the users' mobile devices, such as smart phones with GPS receivers, that identify the current geographic location of the users. A number of processes are used to update and utilize the data stored in data store 340.

Process 360 is a user location sharing setup process that allows the users to decide which users are allowed access to the users' current geographic location data. This process updates the users' "whitelists" and "blacklists" that detail those users from the user community that are allowed to access the users' current geographic location data and those that are denied access to such data. Process 370 is the user current location handler process that routinely receives updated current location data from the users included in the user community. The location data is automatically transmitted from the users' mobile devices, such as smart phones, without the user having to manually perform any actions or functions on the device. The users' current geographic location data is stored in data store 340.

Process 380 is the user location request handler that processes location requests from users (requestors) for the current location of other users in the user community. Process 380 determines whether a requestor can access a particular user's current location data and returns a user location response to the requestor pertaining to relevant users that have allowed the requestor access to such users' current geographic location data.

Figure 4:
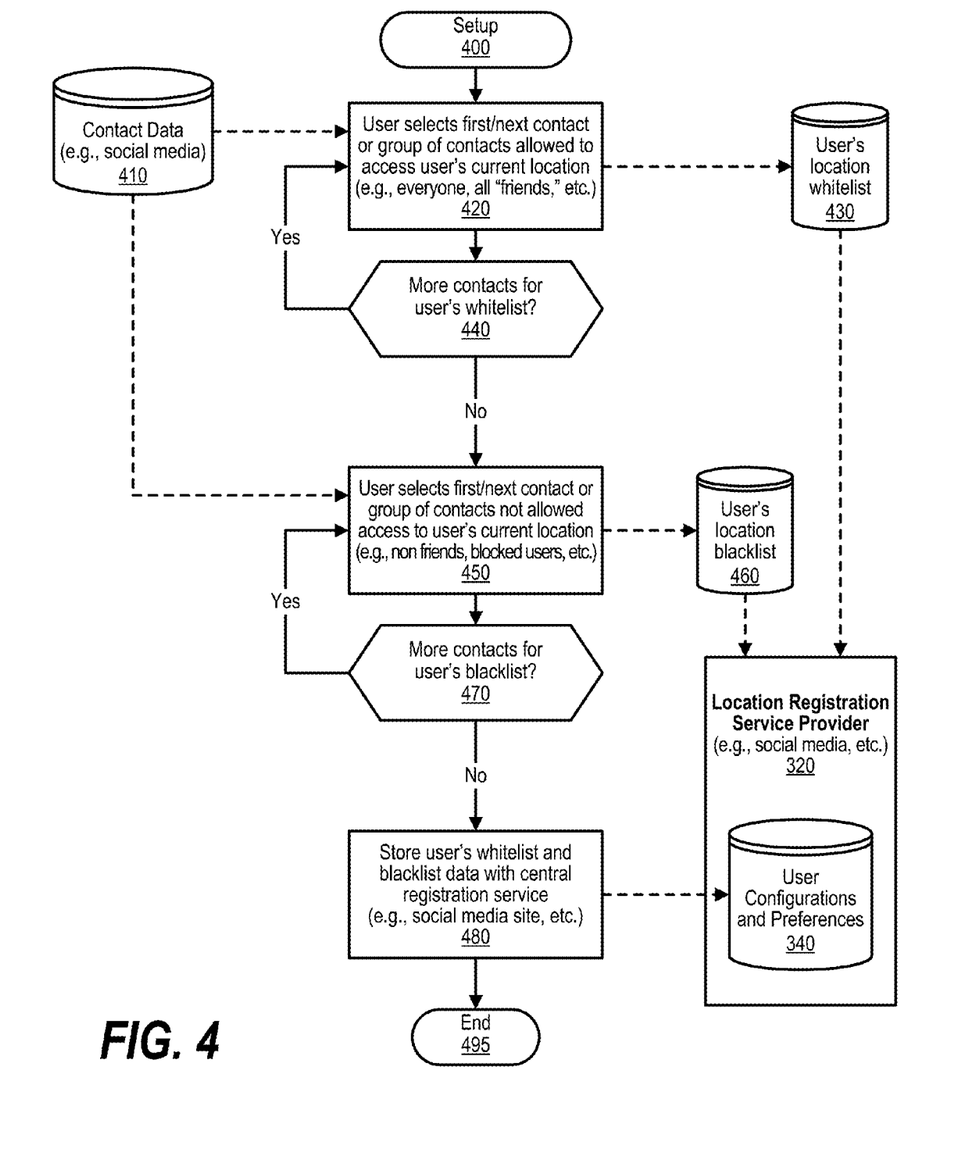
FIG. 4 is a flowchart depicting setup steps performed to configure a user's preferences in a system that identifies objects and people proximate to a located object or person.

FIG. 4 is a flowchart depicting setup steps performed to configure a user's preferences in a system that identifies objects and people proximate to a located object or person. FIG. 4 processing commences at 400 and shows the steps taken by a setup process that receives and stores the user's preferences. At step 420, the user selects the first contact or group of contacts that the user wants to allow access to the user's current location data (e.g., everyone, all "friends," etc.). Step 410 retrieves the contact data from data store 410, such as a social media site, an organizational site listing employees of an organization, etc. Step 420 stores the data pertaining to users that are allowed to access the user's current location data in user's location whitelist data store 430. The process next determines whether the user wishes to add more contacts to the user's whitelist (decision 440). If the user wishes to add more contacts to the user's whitelist, then decision 440 branches to the 'yes' branch which loops back to step 420 to receive and process the next contact or group of contacts to add to the whitelist. This looping continues until the user does not wish to add any more contacts to the whitelist, at which point decision 440 branches to the 'no' branch exiting the loop.

At step 450, the user selects the first contact or group of contacts that the user does not want to have access to the user's current location data (e.g., non-friends, blocked users, etc.). Step 450 retrieves the contact data from data store 410, such as a social media site, an organizational site listing employees of an organization, etc. Step 420 stores the data pertaining to users that are not allowed access to the user's current location data in user's location blacklist data store 460. The process next determines whether the user wishes to add more contacts to the user's blacklist (decision 470). If the user wishes to add more contacts to the user's blacklist, then decision 470 branches to the 'yes' branch which loops back to step 450 to receive and process the next contact or group of contacts to add to the blacklist. This looping continues until the user does not wish to add any more contacts to the blacklist, at which point decision 470 branches to the 'no' branch exiting the loop. At step 480, the process transmits the user's whitelist and blacklist data to service provider 320 that provides a central registration service (e.g., social media site, organization's site, etc.). The user's preferences are updated by the service provider in user preferences data store 340. The setup processing shown in FIG. 4 thereafter ends at 495.

Figure 5:
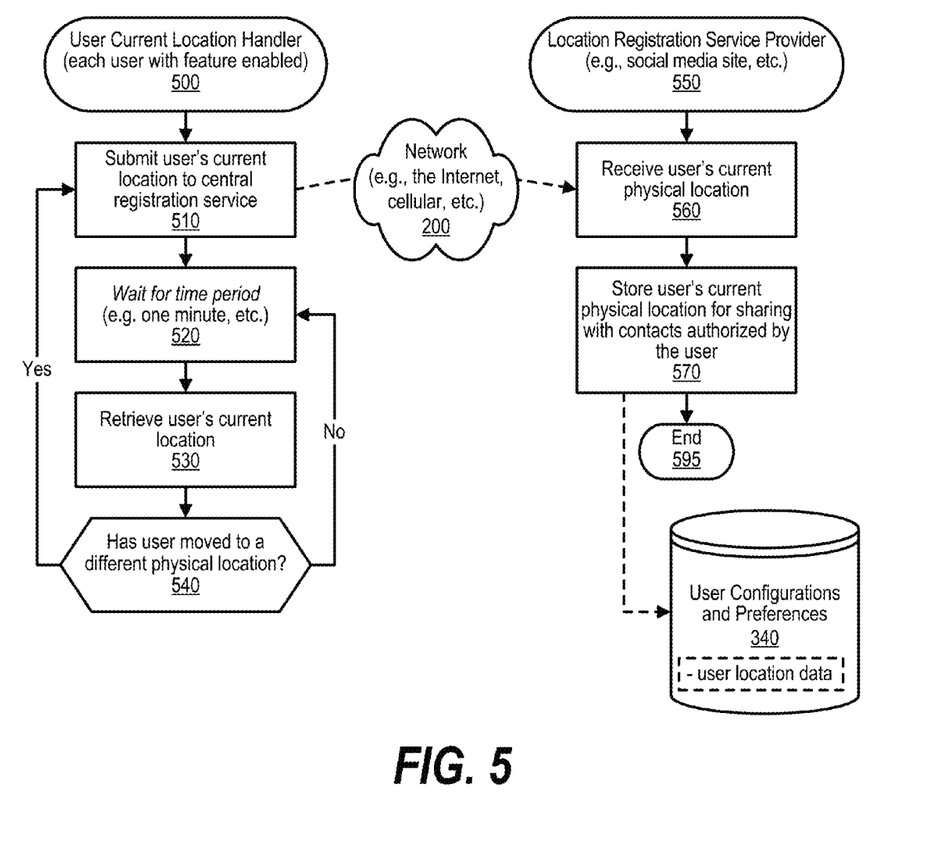
FIG. 5 is a flowchart showing steps taken to keep track of registered user locations at a service provider.

FIG. 5 is a flowchart showing steps taken to keep track of registered user locations at a service provider, such as a social media site, an organization's website, etc. Processing performed by the user's mobile device (e.g, smart phone, etc.) is shown commencing at 500 and includes steps 500 through 540. The Current Location Handler is performed at the mobile device of each user that has the location tracking feature enabled. At step 510, the process performed by the user's mobile device transmits the user's current location data to a central registration that is maintained by the service provider. The user's mobile device determines the user's current location data using GPS technology installed on the user's mobile device. At step 520, the process waits for a period of time to elapse before sending the next location data (e.g. one minute, etc.). In one embodiment, the process only sends updated current location data when it senses that the user's current location has changed by a distance that exceeds a given threshold (e.g., when the user has moved more than five feet, etc.). At step 530, the process performed by the mobile device retrieves user's current location from the GPS installed on the mobile device. The process determines whether the user moved to a different physical location (decision 540). In one embodiment, the determination is made based on whether the user has moved a distance that exceeds a given threshold. If the user has moved to a different physical location, then decision 540 branches to the 'yes' branch which loops back to step 510 to send the user's new physical location to the service provider. On the other hand, if the user has not moved to a different physical location, then decision 540 branches to the 'no' branch which loops back to the wait process of step 520 without sending the user's physical location to the service provider.

Service provider processing shown in FIG. 5 commences at 550 and includes steps 550 through 595. These steps are taken by a process performed by a service provider (e.g., social media site, organization's website, etc.) that maintains the location registration data. At step 560, the service provider receives the user's current physical location that was transmitted from the user's mobile device to the service provider via computer network 200, such as the Internet. At step 570, the service provider stores the user's current physical location that was received from the user in data store 340. This location data is available for sharing with contacts that have been authorized by the user, such as the user's employer, spouse, family, etc. The service provider process shown in FIG. 5 thereafter ends at 595.

Figure 6:
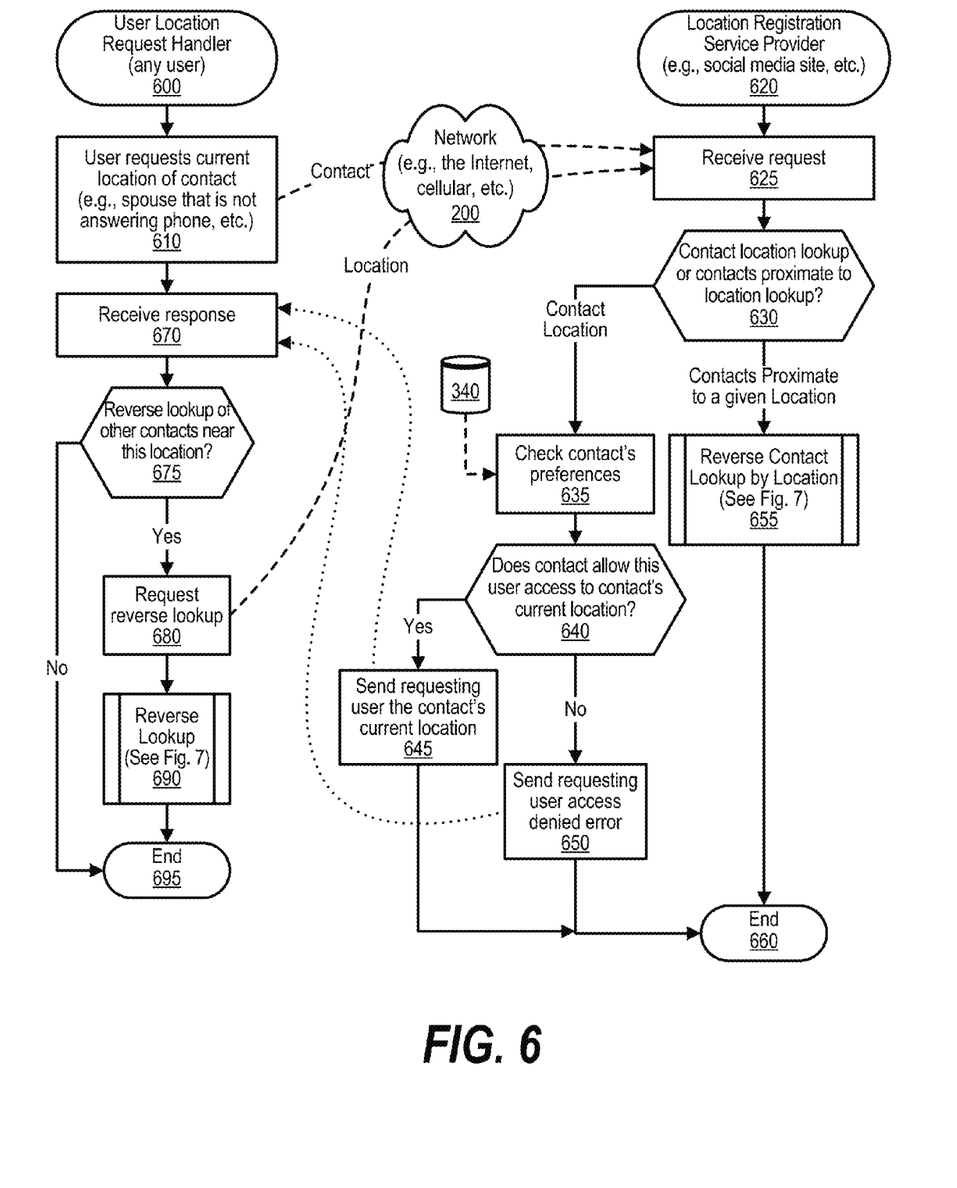
FIG. 6 is a flowchart depicting steps performed between a user and a service provider of receiving a location of a device associated with a target person that the user is trying to contact.

FIG. 6 is a flowchart depicting steps performed between a user and a service provider of receiving a location of a device associated with a target person that the user is trying to contact. Processing performed by the user's device shown in FIG. 6 commences at 600 and depicts steps taken by the user's device to request another user's location and perform a reverse lookup on other users if desired. At step 610, the user's device transmits a request for the current location of another user, such as the user's spouse, child, employee, etc. The request is transmitted through computer network 200, such as the Internet, to the service provider.

Service provider processing shown in FIG. 6 commences at 620 and shows the steps taken by the service provider (e.g., social media site, organization website, etc.) to process a location request from a requestor. At step 625, the service provider receives a location request from the requestor via computer network 200. The service provider process determines whether the request is for a contact location lookup for a reverse lookup for contacts that are near, or proximate to, a location provided by the requestor (decision 630). If the request is for a particular contact, then decision 630 branches to the 'yes' branch to perform steps 635 through 650. On the other hand, if the request is a reverse lookup request for those contacts proximate to a given location, then decision 630 branches to the 'no' branch whereupon, at predefined process 655, the service provider performs predefined process 655 (see FIG. 7 and corresponding text for processing details).

If the request is for the location of a particular contact then, at step 635, the service provider checks the preferences of the contact that is being requested by the requestor. The contact's preferences are retrieved from data store 340 and includes the contact's whitelist of users allowed to access the contact's location data as well as the contact's blacklist of users not allowed to access the contact's location data. Based on the contact's preferences, the service provider determines whether to allow the requestor access to this contact's current location data (decision 640). If the contact allows this requestor access to the contact's current location data, then decision 640 branches to the 'yes' branch to perform step 645. On the other hand, if the contact does not allow this requestor access to the contact's current location data, then decision 640 branches to the 'no' branch to perform step 650. In the case where the request is granted then, at step 645, the service provider transmits the contact's current location data back to the requestor. In the case where the request is denied then, at step 650, the process transmits an access denied error back to the requestor. Service provider processing shown in FIG. 6 thereafter ends at 660.

Returning to processing performed at the requestor's device, at step 670, the requestor's device receives a response from the service provider. The requestor now determines whether a reverse lookup of other contacts near the location provided by the service provider is desired (decision 675). If a reverse lookup of other contacts near the location provided by the service provider is desired, then decision 675 branches to the 'yes' branch to perform steps 680 and 690. On the other hand, if a reverse lookup of other contacts near the location provided by the service provider is not desired, then decision 675 branches to the 'no' branch bypassing steps 680 and 690.

If a reverse lookup of other contacts is desired, then at step 680, the process transmits a reverse lookup request to the service provider with the request including the geographic area of interest to the user. In addition, the request might include a circumference or size of the area of interest around the geographic area (e.g., contacts within ten feet of the location, contacts within one hundred yards of the location, etc.). The size of the area of interest might depend on the type of environment in which the target contact was located (e.g., in a store, in a park, etc.). At predefined process 690, the user's device performs the Reverse Lookup routine (see FIG. 7 and corresponding text for processing details). This routine receives contact data pertaining to contacts proximate to the area of interest (e.g., those contacts near the requestor's wife, child, employee, etc.). The requestor's device process shown in FIG. 6 thereafter ends at 695.

Figure 7:
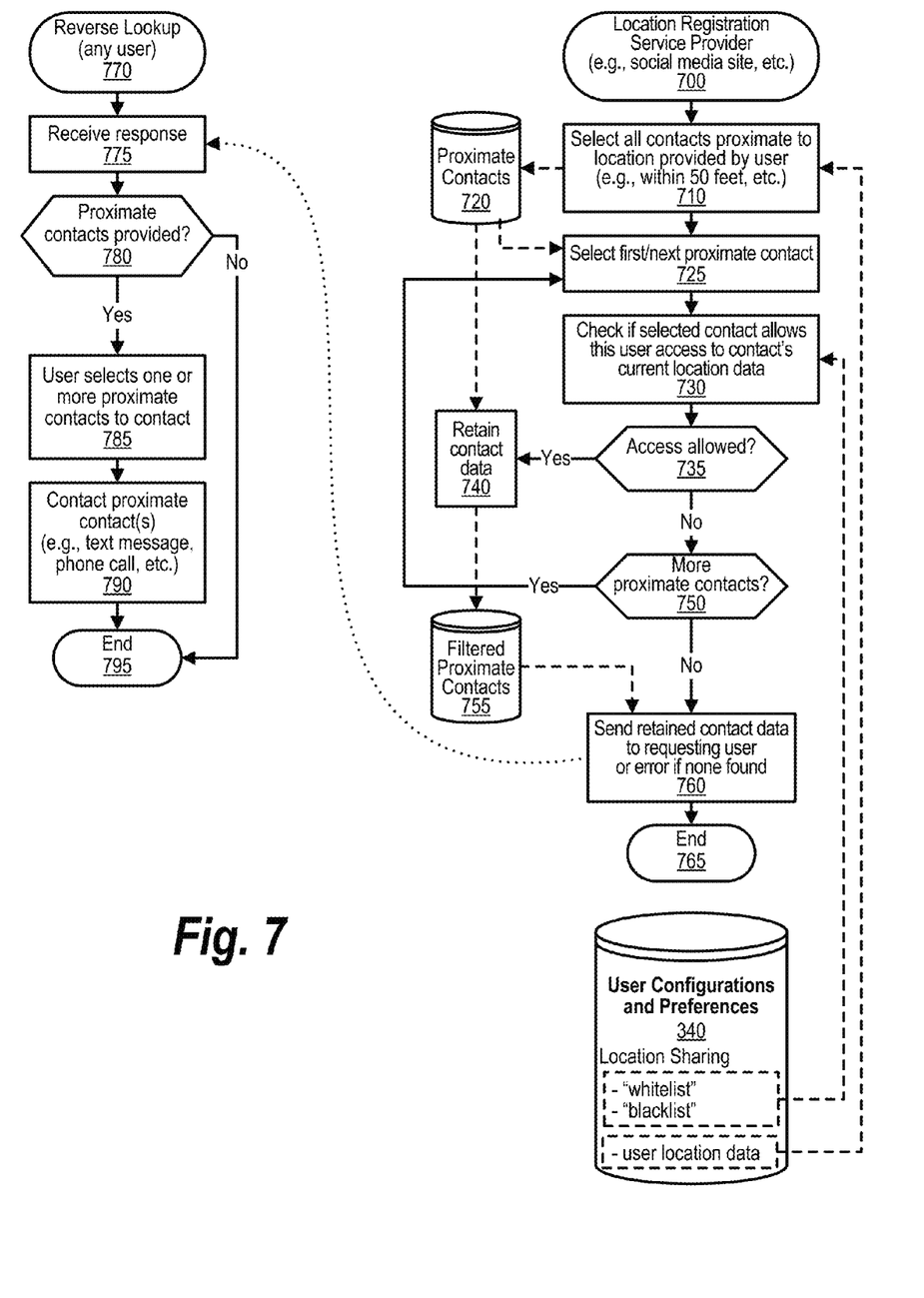
FIG. 7 is a flowchart showing steps performed to inform the user of other contacts proximate to the target person and allowing the user to contact such other contacts.

FIG. 7 is a flowchart showing steps performed to inform the user of other contacts proximate to the target person and allowing the user to contact such other contacts. The service provider processing shown in FIG. 7 commences at 700 and depicts the steps taken by the service provider when processing a reverse lookup request. At step 710, the service provider process selects all contacts that are currently proximate to location provided by the requestor (e.g., within 50 feet, etc.). In one embodiment, the size of the area is a parameter that is provided in the request received from the requestor. Step 710 stores the selected contact data in proximate contacts data store 720. At step 725, the service provider process selects the first proximate contact from data store 720.

At step 730, the service provider process checks the selected contact's preferences (e.g., whitelist, blacklist, etc.) to determine if the selected contact allows this user (the requestor) access to the selected contact's current location data. The service provider process determines as to whether the requestor is allowed access to the selected contact's location data (decision 735). If the requestor is allowed access to the selected contact's location data, then decision 735 branches to the 'yes' branch to perform step 740. On the other hand, if the requestor is not allowed access to the selected contact's location data, then decision 735 branches to the 'no' branch bypassing step 740. At step 740, the service provider process retains the selected contact's data in filtered proximate contacts data store 755.

The service provider process determines whether there are more proximate contacts to process (decision 750). If there are more proximate contacts to process, then decision 750 branches to the 'yes' branch which loops back to step 725 to select and process the next proximate contact as described above. This looping continues until there are no more proximate contacts to process, at which point decision 750 branches to the 'no' branch exiting the loop. At step 760, the service provider process transmits the retained (filtered) contact data to the requesting user or transmits an error to the requestor if no proximate contacts were found that can be provided to this requestor. The service provider processing shown in FIG. 7 thereafter ends at 765.

The requestor's processing performed at the requestor's device shown in FIG. 7 commences at 770 and shows the steps taken by the requestor's device to process a reverse lookup for contacts in a given geographic area. At step 775, the requestor's device receives a response from the service provider. The process performed by the requestor's device determines as to whether the service provider provided data pertaining to one or more proximate contacts (decision 780). If the service provider provided data pertaining to one or more proximate contacts, then decision 780 branches to the 'yes' branch to perform steps 785 and 790. On the other hand, if the service provider did not provide data pertaining any proximate contacts, then decision 780 branches to the 'no' branch bypassing steps 785 and 790.

At step 785, the requestor selects one or more of the proximate contacts that were provided by the service provider to contact electronically. At step 790, the process performed by the requestor's device receives input from the requestor to contacts one or more contact(s) proximate to the geographic area of interest (e.g., area where the requestor's spouse, child, employee is currently located, etc.). The contact can be made using any communication means such as a text message, phone call, etc. The process performed by the requestor's device as shown in FIG. 7 thereafter ends at 795.

Figure 8:
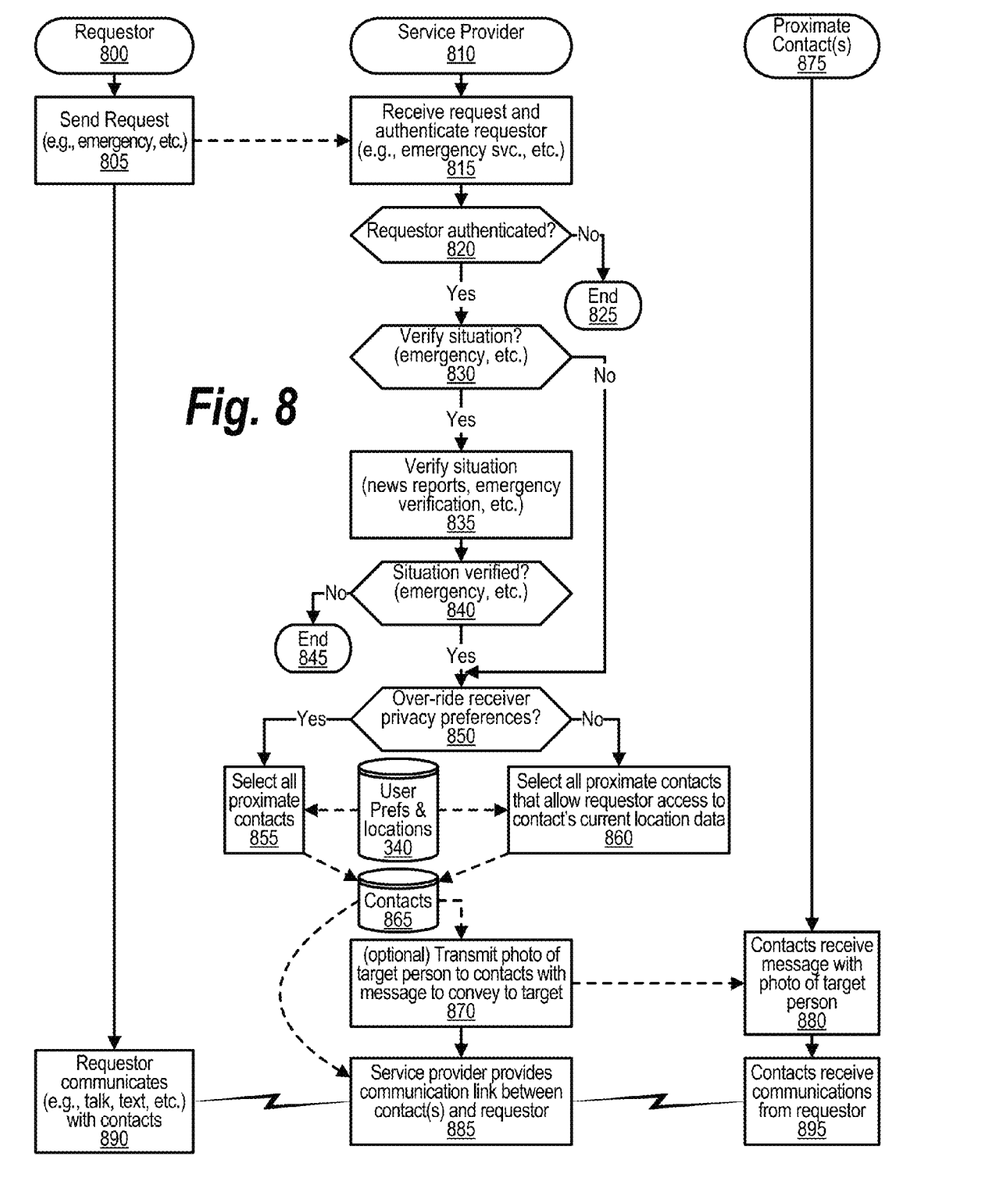
FIG. 8 is a flowchart showing steps of an alternative embodiment in which the service provider establishes a communication link between the requestor and one or more proximate contacts.

FIG. 8 is a flowchart showing steps of an alternative embodiment in which the service provider establishes a communication link between the requestor and one or more proximate contacts. Processing performed by the requestor in FIG. 8 commence at 800 and shows the steps taken by the requestor that is attempting to communicate with a target person that is proximate to one or more contacts. At step 805, the process performed by the requestor's device sends a request (e.g., emergency, etc.) to the service provider.

Processing performed by the service provider in FIG. 8 commence at 810 and shows the steps taken by the service provider (e.g., social media site, organization's site, etc.) that facilitates communication between the requestor and one or more contacts that are proximate to the target person. At step 815, the service provider process receives the request from the requestor and attempts to authenticate the requestor. For example, a user identifier and password might be used or other authentication means. The process determines as to whether the requestor was authenticated by the service provider (decision 820). If the requestor was authenticated by the service provider, then decision 820 branches to the 'yes' branch for further processing. On the other hand, if the requestor was not authenticated by the service provider, then decision 820 branches to the 'no' branch and processing ends at 825.

The process performed by the service provider determines whether the situation (if any) reported by the requestor should be verified before contacting the proximate contacts (decision 830). If the situation should be verified, then decision 830 branches to the 'yes' branch to perform step 835. On the other hand, if the situation need not be verified, then decision 830 branches to the 'no' branch bypassing step 835. At step 835, the service provider process attempts to verify the situation reported by the requestor. The service provider might use news reports, contact emergency responders, or the like, to verify the situation. The service provider process determines whether the situation was successfully verified (decision 840). If the situation was successfully verified, then decision 840 branches to the 'yes' branch for further processing. On the other hand, if the situation was not successfully verified, then decision 840 branches to the 'no' branch whereupon processing ends at 845.

The service provider process determines whether to over-ride privacy preferences made by contacts based on the requestor and/or the situation that is being reported (decision 850). If the system decides to over-ride contact privacy preferences, then decision 850 branches to the 'yes' branch to perform step 855. On the other hand, if the system decides to not over-ride contact privacy preferences based on the requestor and/or the situation, then decision 850 branches to the 'no' branch to perform step 860. At step 855, the service provider process selects all proximate contacts from data store 340 that are proximate to the target person regardless of the proximate contacts' privacy settings. If contact privacy settings are being observed, then at step 860, the service provider process selects all contacts that are proximate to the target person and that allow the requestor access to such contacts' current location data. The service provider process stores the relevant proximate contact data in contacts data store 865.

At step 870, the service provider process performs an optional process that transmits a photograph of the target person to the proximate contacts with an appropriate message to convey to target (e.g., "important message—you are currently near the pictured individual that the requestor is trying to contact—please help by notifying the pictured target person of the communication request."). Processing performed by the proximate contacts that are being contacted in FIG. 8 commence at 875 and shows the steps taken by the contacts that are proximate to the target person. At step 880, the process performed by the proximate contacts' devices receives a message with a photograph of the target person along with an appropriate message. At step 885, the services provider process provides a communication link between one or more proximate contacts and the requestor. The communication link allows the requestor's device to communicate (e.g., voice, text, etc.) with one or more devices used by proximate contacts without the requestor being provided with identification information (e.g., telephone numbers, name, etc.) of the proximate contacts. At step 890, the process performed by the requestor's communication device (e.g., smart phone, etc.) communicates with one or more proximate contacts using the communication link provided by the service provider. Likewise, at step 895, the process performed by the proximate contact(s) communicates with the requestor using the communication link provided by the service provider.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   identifying a location of a first mobile device associated with a target person;
   identifying one or more second mobile devices with current locations proximate to the identified location, wherein the identifying is communicated over a communications network that does not include device-to-device communications between the second mobile devices; and
   providing a requestor with contact data corresponding to at least one of the second mobile devices, wherein a message to the target person is transmitted over the communications network to at least one of the second mobile devices, and wherein the message includes a photograph of the target person.

2. The method of claim 1 further comprising:
   receiving, from the requestor, the identified location; and
   retrieving user preference data corresponding to the second mobile devices, wherein the preference data indicates whether the requestor is permitted access to the current locations of the second mobile devices.

3. The method of claim 1 further comprising:
   periodically receiving, from a plurality of mobile devices that includes each of the second mobile devices, a current location;
   storing the received current location in a data store; and
   searching the data store for the identified location, wherein the searching results in the identified second mobile devices.

4. The method of claim 3 further comprising:
   receiving a set of user preference data from users of the plurality of mobile devices, wherein each of the user preference data indicates one or more contacts that are allowed to access the respective user's current location; and removing one or more of the identified second mobile devices, wherein the removing results in the at least one of the second mobile devices that are provided to the requestor.

5. The method of claim 4 wherein the user preference data includes a whitelist of the contacts that are allowed to access the respective user's current location.

6. The method of claim 4 wherein the user preference data includes a blacklist of the contacts that are denied access the respective user's current location.

7. The method of claim 1 wherein the identification of the first mobile device further comprises:
receiving a location request pertaining to the location of the target person;
retrieving a current location of the target person; and
transmitting the current location of the target person to the requestor.

8. An information handling system comprising:
one or more processors;
a memory coupled to at least one of the processors;
one or more communication adapters that communicate with a plurality of user devices; and
a set of instructions stored in the memory and executed by at least one of the processors to:
identify a location of a first mobile device associated with a target person, wherein the location is retrieved from the memory;
retrieve, from the memory, one or more second mobile devices with current locations proximate to the identified location, wherein the identifying is communicated over a communications network that does not include device-to-device communications between the second mobile devices;
transmit, via one of the communication adapters and over the communications network, contact data corresponding to at least one of the second mobile devices to a device operated by a requestor; and
transmit, via one of the communication adapters and over the communications network, a message to at least one of the second mobile devices, wherein the message includes a photograph of the target person.

9. The information handling system of claim 8 wherein the set of instructions comprise further instructions to:
receive, from the requestor over one of the communication adapters, the identified location; and
retrieve, from the memory, user preference data corresponding to the second mobile devices, wherein the preference data indicates whether the requestor is permitted access to the current locations of the second mobile devices.

10. The information handling system of claim 8 wherein the set of instructions comprise further instructions to:
periodically receive, from a plurality of mobile devices that includes each of the second mobile devices, a current location;
storing the received current location in the memory; and
searching the memory for the identified location, wherein the searching results in the identified second mobile devices.

11. The information handling system of claim 10 wherein the set of instructions comprise further instructions to:
receive, over the communication adapters, a set of user preference data from users of the plurality of mobile devices, wherein each of the user preference data indicates one or more contacts that are allowed to access the respective user's current location;
store the user preference data in the memory; and remove one or more of the identified second mobile devices, wherein the removal results in the at least one of the second mobile devices that are provided to the requestor over one of the communication adapters.

12. The information handling system of claim 11 wherein the user preference data includes a whitelist of the contacts that are allowed to access the respective user's current location.

13. The information handling system of claim 11 wherein the user preference data includes a blacklist of the contacts that are denied access the respective user's current location.

14. The information handling system of claim 8 wherein the identification of the first mobile device further comprises instructions to:
receive, at one of the communication adapters, a location request pertaining to the location of the target person;
retrieve, from the memory, a current location of the target person; and
transmit, over one of the communication adapters, the current location of the target person to the requestor.

15. A computer program product comprising:
a computer readable storage medium comprising a set of computer instructions, the computer instructions effective to:
identify a location of a first mobile device associated with a target person;
identify one or more second mobile devices with current locations proximate to the identified location, wherein the identifying is communicated over a communications network that does not include device-to-device communications between the second mobile devices; and
provide a requestor with contact data corresponding to at least one of the second mobile devices, wherein a message to the target person is transmitted over the communications network to at least one of the second mobile devices, and wherein the message includes a photograph of the target person.

16. The computer program product of claim 15 wherein the computer instructions comprise instructions that are further effective to:
receive, from the requestor, the identified location; and
retrieve user preference data corresponding to the second mobile devices, wherein the preference data indicates whether the requestor is permitted access to the current locations of the second mobile devices.

17. The computer program product of claim 15 wherein the computer instructions comprise instructions that are further effective to:
periodically receive, from a plurality of mobile devices that includes each of the second mobile devices, a current location;
store the received current location in a data store; and
search the data store for the identified location, wherein the searching results in the identified second mobile devices.

18. The computer program product of claim 17 wherein the computer instructions comprise instructions that are further effective to:
receive a set of user preference data from users of the plurality of mobile devices, wherein each of the user preference data indicates one or more contacts that are allowed to access the respective user's current location; and remove one or more of the identified second mobile devices, wherein the removing results in the at least one of the second mobile devices that are provided to the requestor.

19. The computer program product of claim 18 wherein the user preference data includes a whitelist of the contacts that are allowed to access the respective user's current location and a blacklist of the contacts that are denied access the respective user's current location.

20. The computer program product of claim 15 wherein the identification of the first mobile device further comprises instructions effective to:

receive a location request pertaining to the location of the target person;

retrieve a current location of the target person; and transmit the current location of the target person to the requestor.

\* \* \* \* \*